United States Patent
Rickard

(10) Patent No.: US 6,317,031 B1
(45) Date of Patent: Nov. 13, 2001

(54) POWER LINE COMMUNICATIONS

(75) Inventor: Robin Paul Rickard, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/230,009

(22) PCT Filed: Jul. 25, 1997

(86) PCT No.: PCT/GB97/02027

§ 371 Date: Sep. 17, 1999

§ 102(e) Date: Sep. 17, 1999

(87) PCT Pub. No.: WO98/06187

PCT Pub. Date: Feb. 12, 1998

(30) Foreign Application Priority Data

Aug. 6, 1996 (GB) .................................................. 9616543

(51) Int. Cl.$^7$ .................................................. H04M 11/04
(52) U.S. Cl. .................................. 340/310.03; 340/310.01; 340/310.02; 340/310.07; 307/3; 307/89; 375/258; 455/63
(58) Field of Search ......................... 340/310.03, 310.01, 340/310.02, 310.05, 310.06, 310.07, 310.04; 307/3, 89, 91, 1; 375/257, 258; 455/63

(56) References Cited

U.S. PATENT DOCUMENTS

| | | | |
|---|---|---|---|
| 4,357,598 | * | 11/1982 | Melvin et al. .................. 340/310.01 |
| 4,473,817 | * | 9/1984 | Perkins ............................. 340/310.01 |
| 4,602,240 | * | 7/1986 | Perkins et al. .................. 340/310.01 |
| 4,766,414 | * | 8/1988 | Shuey .............................. 340/310.01 |
| 4,903,006 | * | 2/1990 | Boomgaard ..................... 340/310.01 |
| 4,918,422 | | 4/1990 | Mak ................................. 340/310 R |
| 5,818,517 | * | 10/1998 | Hudson et al. ....................... 348/21 |
| 5,828,293 | * | 10/1998 | Rickard ............................ 340/310.04 |
| 5,977,650 | * | 11/1999 | Rickard et al. .......................... 307/3 |
| 6,037,678 | * | 3/2000 | Rickard ........................... 340/310.01 |

FOREIGN PATENT DOCUMENTS

| | | |
|---|---|---|
| 60051043 | 3/1985 | (JP) . |
| 02177731 | 7/1990 | (JP) . |
| WO 96/17444 | 12/1995 | (WO) . |

* cited by examiner

*Primary Examiner*—Nina Tong
(74) *Attorney, Agent, or Firm*—Lee, Minn, Smith, McWilliams, Sweeney and Ohlson

(57) ABSTRACT

An Apparatus for extracting communications signals from power lines, which lines are arranged such that leakage of signals occurs between them. The apparatus receives a signal from each of at least two of lines (blue, red, yellow) and combines the received signals so as to increase the ratio of wanted signal to interference plus noise S/(1+N). Preferably the combining is achieved by weights $W_B$, $W_R$, $W_Y$ and a summer. The weights phase shift and scale the received signals in amplitude. The apparatus can also be used for transmitting in the downstream direction.

18 Claims, 7 Drawing Sheets

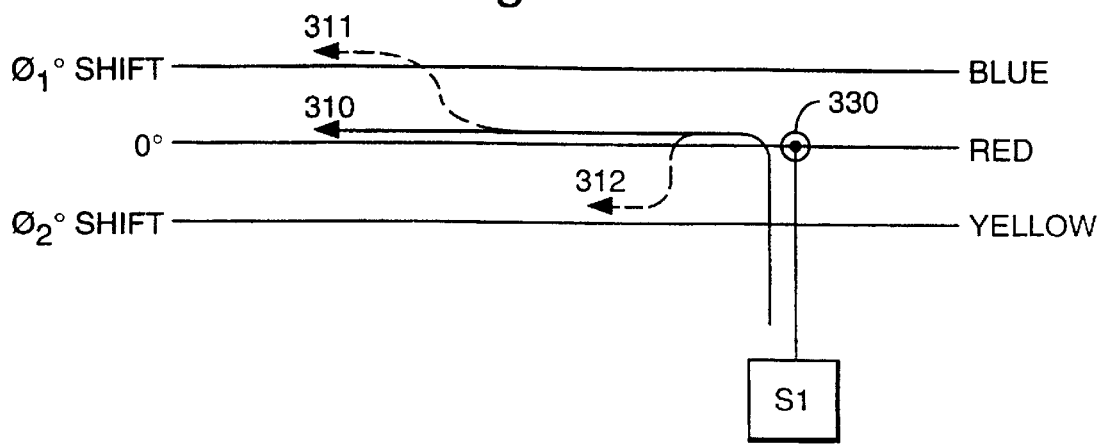
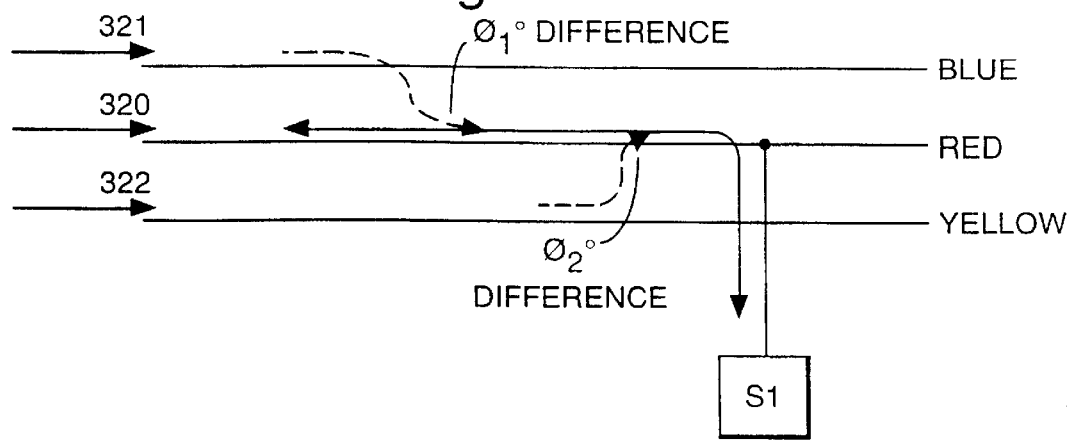

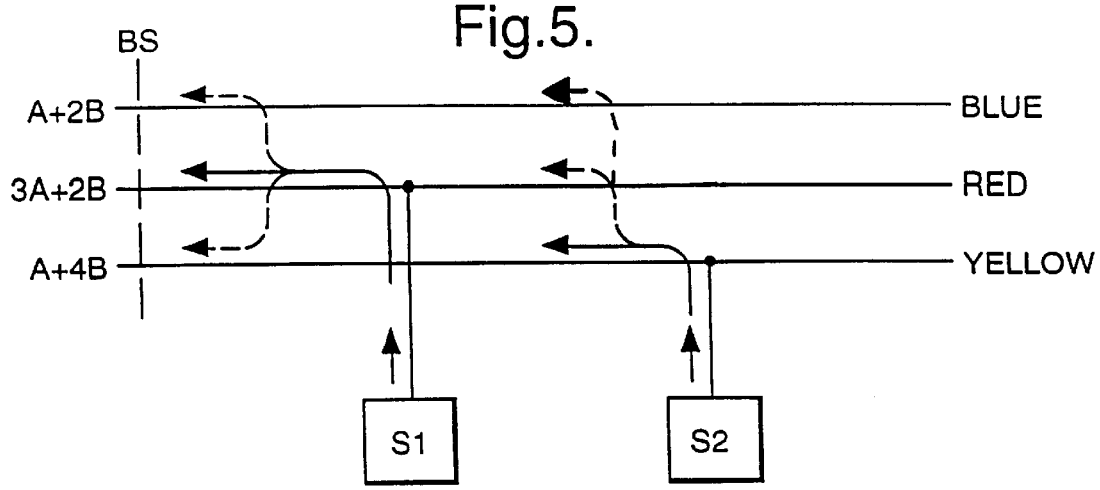
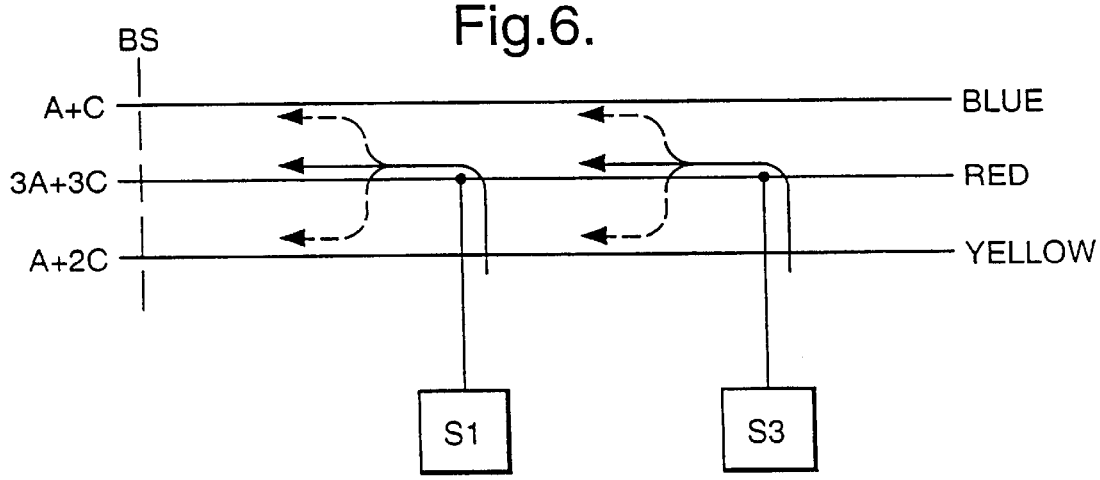
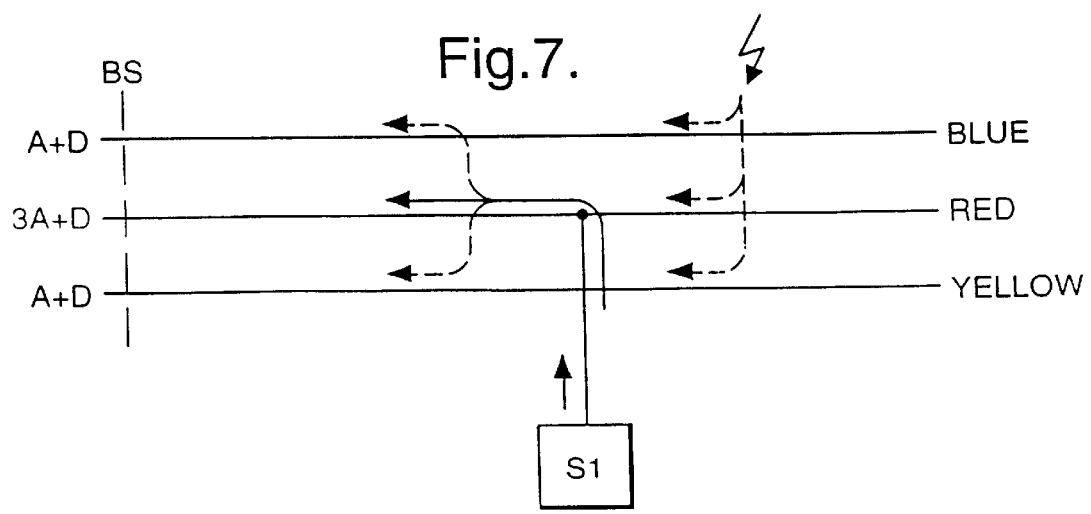

POWER LINE COMMUNICATIONS

TECHNICAL FIELD

This invention relates to an apparatus and method for use in extracting communications signals from power lines, and for applying communications signals to power lines.

BACKGROUND OF THE INVENTION

It is known to transport telecommunications signals over an electricity distribution or power transmission network. Patent application WO 94/09572 A1 (Norweb) describes such a network. Delivering a telecommunications service in this manner is attractive as it overcomes one of the greatest costs in providing a new telecommunications network i.e. installing cabling to each subscriber. Existing electricity distribution cabling is used to carry the telecommunications signals.

FIG. 1 shows an example of an electricity distribution network which is adapted to carry telecommunications signals. Mains electricity enters the network from an 11 kV transmission line 105 and is transformed by substation 100 into a 415V supply which is delivered over cable 120 to subscribers S1, S2, S3. A base station BS couples telecommunications signals $V_B$, such as voice and data signals, at injection point 110 onto distribution cable 120. The telecommunications signals propagate over the cable on radio frequency carriers to transceiver units TRX at subscriber premises S1, S2, S3. In the upstream direction, telecommunications signals are transmitted from the subscriber transceiver units towards the base station.

One of the problems with using electricity distribution cables to transport RF signals results from the structure of the cable. The inner section of the cable comprises a group of phase lines, each line carrying one of the three supply phases. At radio frequencies (RF) the capacitance which exists between these separate lines causes signals which originate on one line to leak or couple onto neighbouring lines. The process of coupling between phase lines introduces a phase shift. Therefore, after propagating along the lines, the components of a communications signal on each line will no longer be in phase with each other but will be of different phase and amplitude. This causes problems with receiving equipment.

A further problem with using power lines to transport telecommunications signals is that of interference from electrical equipment connected to the lines. Thermal noise on the lines is generally at a much lower level than other sources of interference such as broadband interference. Broadband interference occurs periodically, occupying the same frequencies as the RF carriers used to carry telecommunications signals, and occurring at levels which are high enough to corrupt the wanted signals. Interference signals propagate along the network along with the wanted RF signals, and this reduces the signal to interference ratio at the base station receiver. Some of the sources of interference are domestic appliances, particularly appliances having a motor, businesses with machinery, street lighting and other street furniture. In addition, the emissions of external sources such as radio transmitters can be picked up by the network. External sources are a particular problem where part of the distribution network uses overhead lines.

European Patent Application EP 0 063 296 (Westinghouse) describes a communication system for a three-phase power distribution network in which a remote device has three receiver front ends and a demodulator for independently reconstructing three received signals, one from each line.

U.S. Pat. No. 4,918,422 describes an apparatus for extracting inbound information generated line-to-line in a multi-phase electric distribution system. Signalling is achieved by current pulses.

JP 02-177,731 describes a receiver for a distribution line which eliminates 3-phase noise.

SUMMARY OF THE INVENTION

The present invention seeks to address the above problems.

According to a first aspect of the present invention, there is provided an apparatus for extracting communications signals carried upon RF carriers from power lines, which lines suffer from leakage of signals between them, the apparatus comprising:

means for receiving an RF signal from each of at least two of the lines, which received signals include at least one component of a wanted communications signal;

means for variably weighting the received signals so as to increase the ratio of wanted signal to interference plus noise S/(I+N), which interference occupies the same frequencies as the RF carriers.

This has the advantage that the components of the wanted communications signal which reach the apparatus via direct and coupled paths are optimally combined to compensate for the phase shift occurring in the coupling process. It also has the advantage that when a wanted communications signal is present on a first line in combination with unwanted interference, the interference on a second line can be used to cancel or minimise the interference on the first line.

The communications signals can be voice, data or broadband.

Preferably the apparatus further comprises: a measuring unit, coupled to the output of the weighting means, which is operable to measure a quantity of the weighted signal which is indicative of the ratio of wanted signal to interference plus noise; and a control means, coupled to the measuring unit, for controlling the weighting means whereby to increase the value of the measured quantity. This allows the apparatus to adapt to changing conditions on the lines, such as during a period when interference occurs on the lines.

Preferably the weighting means weights the received signals in phase and sums the weighted signals. The weighting means may also scale the received signals in amplitude.

Preferably the control means performs an iterative technique in which perturbations are applied to the weighting means. This establishes an optimum combination of the received signals with minimal disruption.

The measuring unit can measure bit error rate of the weighted signal. Alternatively the measuring unit can: measure at a predetermined period during the weighted signal when the wanted signal is known to be absent; measure at a predetermined period during the weighted signal when a carrier of the wanted signal is present, but the modulating signal is known to be absent; or measure during a period when a test signal is known to be present in the signal.

Advantageously the weighting means is operable to weight the received signals in a different manner during each of a plurality of time periods. These time periods can correspond to time slots on a time-shared carrier frequency, such as the carriers used in the Digital European Cordless Telephone (DECT) protocol. This has the advantage of minimising the amount of equipment required, by sharing it among a plurality of subscribers.

Advantageously the weighting means stores settings for use with weighting signals from a particular subscriber who is coupled to the power lines. This has the advantage of quickly establishing a combination of received signals which is near optimum, such as the values used during the last call with that subscriber, without needing to perform a full adaptive process.

Advantageously, an antenna couples to the weighting means and is operable to receive interference. This is particularly useful for overhead power lines, which are susceptible to picking up RF interference.

Preferably the apparatus is also operable to apply a communications signal to each of at least two of the lines.

Another aspect of the invention provides an apparatus for applying communications signals to power lines, which lines suffer from leakage of signals between them, there being a subscriber terminal coupled to at least one of the power lines, the apparatus comprising:

a dividing means for dividing a communications signal;

means for applying the divided signals to each of at least two of the power lines;

wherein the dividing means is operable to apply weighting to each of the divided signals whereby to increase the ratio of signal to interference plus noise at a receiver of the subscriber terminal.

This operates in a similar manner to the extracting arrangement, and has the advantage that the components of the wanted communications signal which reach the apparatus via direct and coupled paths optimally combine to compensate for the phase shift occurring in the coupling process.

The dividing means of this apparatus can operate with the same settings as the combining means of the combining apparatus. Alternatively the dividing means can be responsive to measurements made by the subscriber terminal.

A further aspect of the invention provides a method of extracting communications signals carried upon RF carriers from power lines, which lines suffer from leakage of signals between them, the method comprising:

receiving an RF signal from each of at least two of the lines, which received signals include at least one component of a wanted communications signal; and variably weighting the received signals so as to increase the ratio of wanted signal to interference plus noise S/(1+N), which interference occupies the same frequencies as the RF carriers.

A still further aspect of the invention provides a method of applying communications signals to power lines, which lines suffer from leakage of signals between them, there being a subscriber terminal coupled to at least one of the power lines, the method comprising:

dividing a communications signal;

applying the divided signals to each of at least two of the power lines; and wherein the dividing means is operable to apply weighting to each of the divided signals whereby to increase the ratio of signal to interference plus noise at a receiver of the subscriber terminal.

BRIEF DESCRIPTION OF THE DRAWINGS

For a better understanding of the invention, and to show by way of example how it may be carried into effect, embodiments will now be described with reference to the accompanying drawings, in which:

FIG. 4 shows an example of signal leakage between lines in the network of FIGS. 1 and 2;

FIGS. 5 to 7 show further examples of activity in the upstream direction along the network of FIGS. 1 and 2;

FIG. 10 shows an example of signal leakage in the downstream direction of the network of FIGS. 1 and 2.

DESCRIPTION OF PREFERRED EMBODIMENTS

In the following description a three-phase (415V) network is described. It will be apparent that the invention is applicable to networks having other numbers of phase lines, or to networks which operate at different supply voltages.

Figure 1:
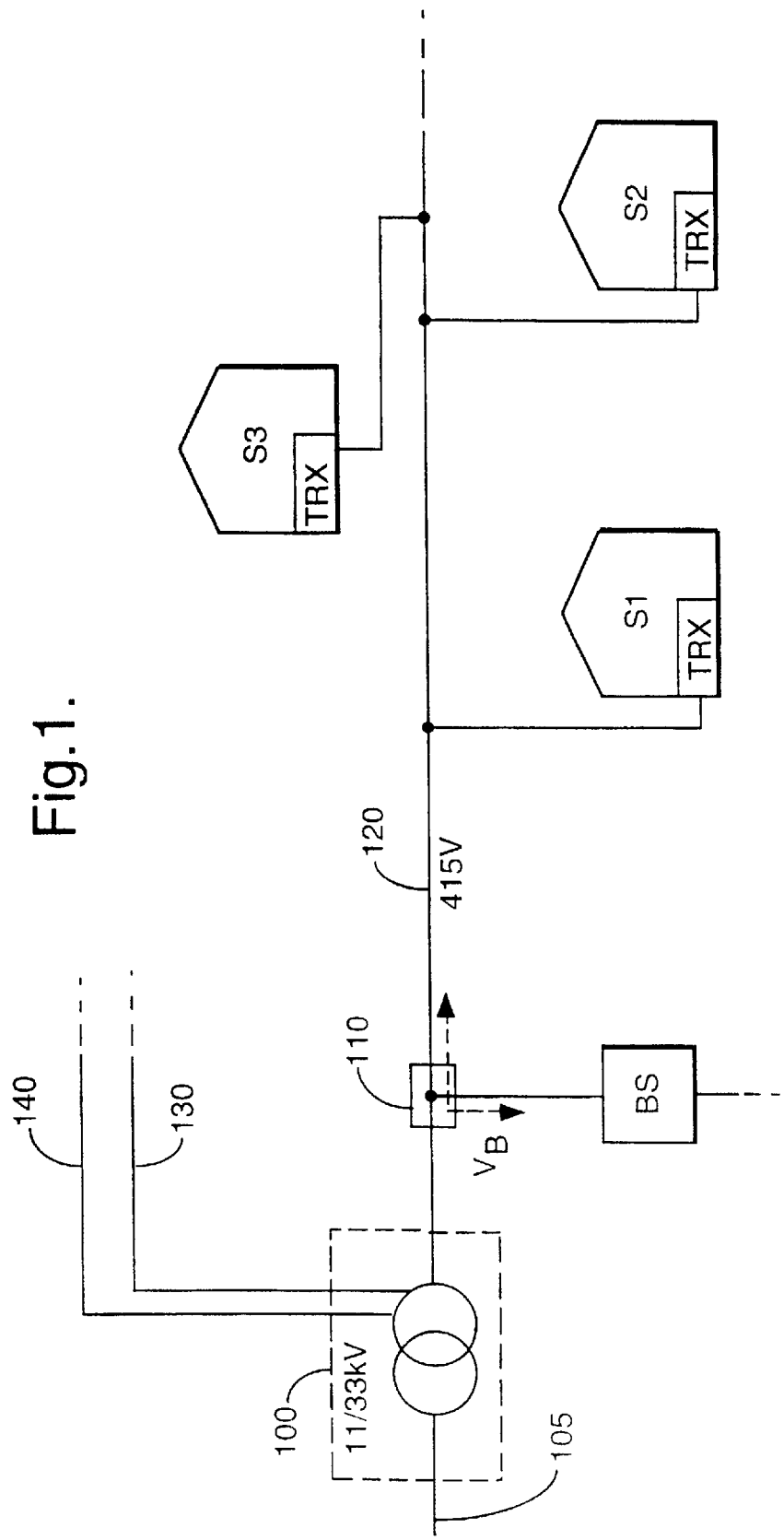
FIG. 1 shows an electricity distribution network which carries telecommunications signals.
Figure 2:
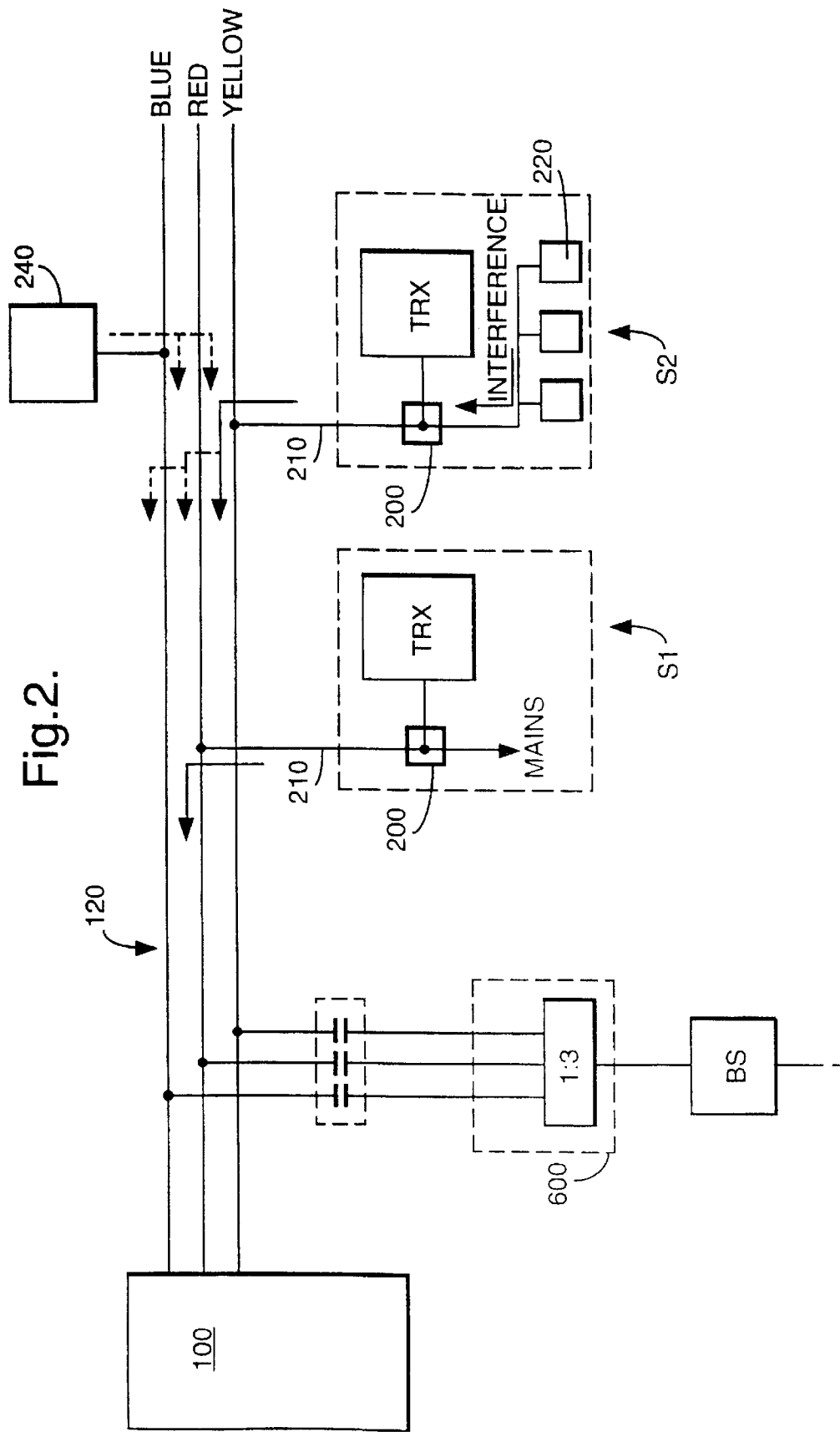
FIG. 2 shows part of the network of FIG. 1 in more detail.

FIG. 2 shows the network of FIG. 1 in more detail. Substation 100 distributes electricity to subscribers S1, S2 over a 415V three-phase network comprising the phase lines blue, red and yellow. Subscribers may receive a single phase electricity supply (240V) or a three-phase electricity supply (415V). Domestic subscribers usually receive a single phase supply. Different subscribers along a street are connected to different phase lines. In FIG. 2 subscriber S1 is shown coupled to the red phase line, and subscriber S2 is coupled to the yellow phase line. This helps to distribute the load of the network evenly across the three phases.

Subscribers couple to a phase line of distribution cable 120 by a branch line 210. The mains supply is distributed over internal wiring in a subscriber's premises to appliances 220.

In the downstream direction telecommunications signals are injected onto the distribution cable 120, often near to substation 100, and propagate along cable 120 to reach subscribers S1, S2 in the same manner as just described for the electricity supply. At a conditioning unit 200 in a subscriber's premises the high frequency telecommunications signals are filtered from the mains electricity supply by a high-pass filter and fed to a communications transceiver TRX. For two-way communications, telecommunications signals must also be transmitted upstream from transceiver units TRX to base station BS.

Electrical appliances 220 at a subscriber's premises generate interference which also flows upstream towards the base station. Network conditioning units 200 may act as a filter to attenuate high frequency interference, and therefore a certain amount of any interference generated in that subscriber's premises, but the attenuation in these units may not be adequate. Other appliances 240, such as street lamps, are also connected to supply cable 120 and may also generate interference which propagates along cable 120 towards the base station.

Figure 3:
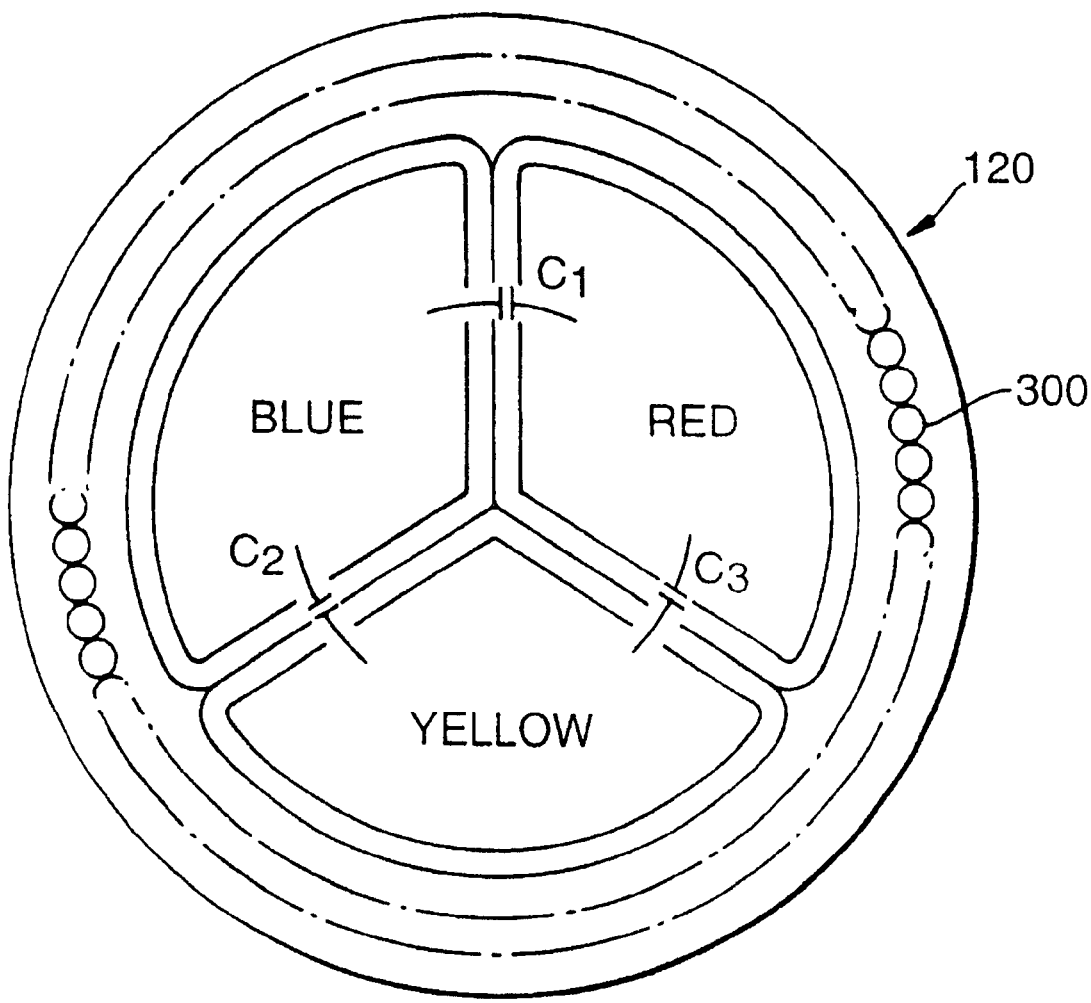
FIG. 3 shows the structure of a typical distribution cable.

FIG. 3 shows, in cross-section, an example of a three phase distribution cable 120, with insulated red, blue and yellow phase lines. An outer section 300 of the cable has a combined earth and neutral. At radio frequencies mutual capacitances $C_1$, $C_2$, $C_3$ exists between the three phase lines in the cable. This causes RF signals which originate on one phase line to appear on other phase lines. Both wanted telecommunications signals and unwanted interference will be coupled in this manner. As an example, interference from appliance 240 (FIG. 2) connected to the blue line will couple onto red and yellow phase lines in the cable. The coupling between phase lines is dependent on transmission frequency, distance along the cable, type of cable and connection details. This affects the amplitude and phase relationship between the original signal on a first phase line and the signal induced on a second phase line.

Therefore, in the upstream path, base station BS receives components of a wanted communications signal in differing proportions on each of the phase lines. When interference is present in the network, the base station will also receive components of an interference signal in differing proportions on each of the phase lines.

FIG. 4 shows a typical scenario in the upstream path in the absence of interference. A subscriber S1 is connected to the red phase line. A signal 310 propagates along the red line. Coupling (leakage) between the red and neighbouring lines results in a signal 311 on the blue line and a signal 312 on the yellow line. The signals on the blue line have a phase shift of $\phi_1°$, and those on the yellow line have a phase shift of $\phi_2°$ with respect to signal 310 on the red line. At the base station a simple summing of the red, blue and yellow signals will not make full use of the blue and yellow signals, and will tend to degrade signal to noise ratio. Phase shifts typically between 0 and 90° could be present between the signals on the three lines. In some circumstances the signals could also be in anti-phase on adjacent lines, whereby a simple summing would cause a severe degradation or even cancelling of the wanted signal. This can occur due to the effect of differing terminations connected to the two lines. For example, in FIG. 4 the transmission along the red line may be phase shifted with respect to the blue and yellow due to mismatch at the connection point 330 for the service cable connecting subscriber S1.

By phase shifting the set of received signals, such that they are aligned in phase, received signal power is maximised. In the FIG. 4 example, this requires phase shifting the blue and yellow lines by $-\phi_1°$ and $-\phi_2°$ respectively.

FIGS. 5 to 7 illustrate three typical scenarios in the upstream path where interference is present on the lines. In these examples solutions are devised to show the existence of weight sets (i.e. phase-shift and/or amplitude scaling for each line) which cancel the interference while preserving the wanted signal. The adaptive algorithm used at the receiver will automatically form an optimum solution which maximises signal to (interference plus noise) ratio S/(I+N), FIG. 5 shows a scenario where the wanted and interference signals originate on different phase lines. A wanted signal 'A' originates from subscriber S1 coupled to the red phase line. An interference signal 'B' originates from subscriber S2 coupled to the yellow phase line. After propagating along cable 120 to base station BS, the magnitude of signals on the lines are:

blue line: A+2B
red line: 3A+2B
yellow line: A+4B

The mutual coupling between phase lines has induced a portion of the wanted signal originating on the red line into the yellow line, and similarly has induced a portion of the interference signal originating on the yellow line into the red line. For clarity we have assumed that the components on each phase line are in phase, but the equipment can operate with any phase relationship between the components.

By combining a weighted portion of the yellow with the red i.e. subtracting ½ yellow from red, this gives 2½A+0B; i.e. the interfering signal is cancelled, and therefore the signal to interference ratio is maximised. In this example the weight in the blue phase is set to zero.

FIG. 6 shows a scenario where the wanted and interference signals originate from different subscribers who are coupled to the same phase line. A wanted signal 'A' originates from subscriber S1 coupled to the red phase line. An interference signal 'C' originates from subscriber S2 who is also coupled to the red phase line. After propagating along cable 120 to base station BS, the magnitude of signals on the lines are:

blue line: A+C
red line: 3A+3C
yellow line: A+2C

The mutual coupling between phase lines has induced a portion of the wanted signal originating on the red line into the yellow line, and similarly has induced a portion of the interference signal originating on the red line into the yellow line.

By combining a weighted portion of the yellow with the red i.e. subtracting ⅔ yellow from red, this gives 1⅔A+0C; i.e. the interfering signal is cancelled, and therefore the signal to interference ratio is maximised. In this case the weight on the blue phase can be set to zero.

FIG. 7 shows a scenario where the wanted signal originates from a subscriber coupled to one phase line and an external interference signal is induced into the phase lines. As before, a wanted signal 'A' originates from subscriber S1 coupled to the red phase line. An interference signal 'D' originates from a source which is external to the network, such as a radio transmitter. The external interference is induced in each of the phase lines. After propagating along cable 120 to base station BS, the magnitude of signals on the lines are:

blue line: A+D
red line: 3A+D
yellow line: A+D

The mutual coupling between phase lines has induced a portion of the wanted signal originating on the red line into the yellow and blue lines.

The interference signal has been induced into each of the lines.

By combining a weighted portion of the blue or yellow with the red i.e. subtracting yellow from red, this gives 2A+0D; i.e. the interfering signal is cancelled, and therefore the signal to interference ratio is maximised. However, in this case it is preferable to weight both the blue and yellow component by a factor of ½, so that the minimum noise solution is derived.

Overhead lines are more susceptible to picking up radio transmissions compared with underground lines. This is partly due to the lack of screening in some overhead lines. In this case it may be beneficial to combine a sample of the interfering signal derived from an antenna with one or more of the signals on the cable phases in order to cancel the interference.

Figure 8:
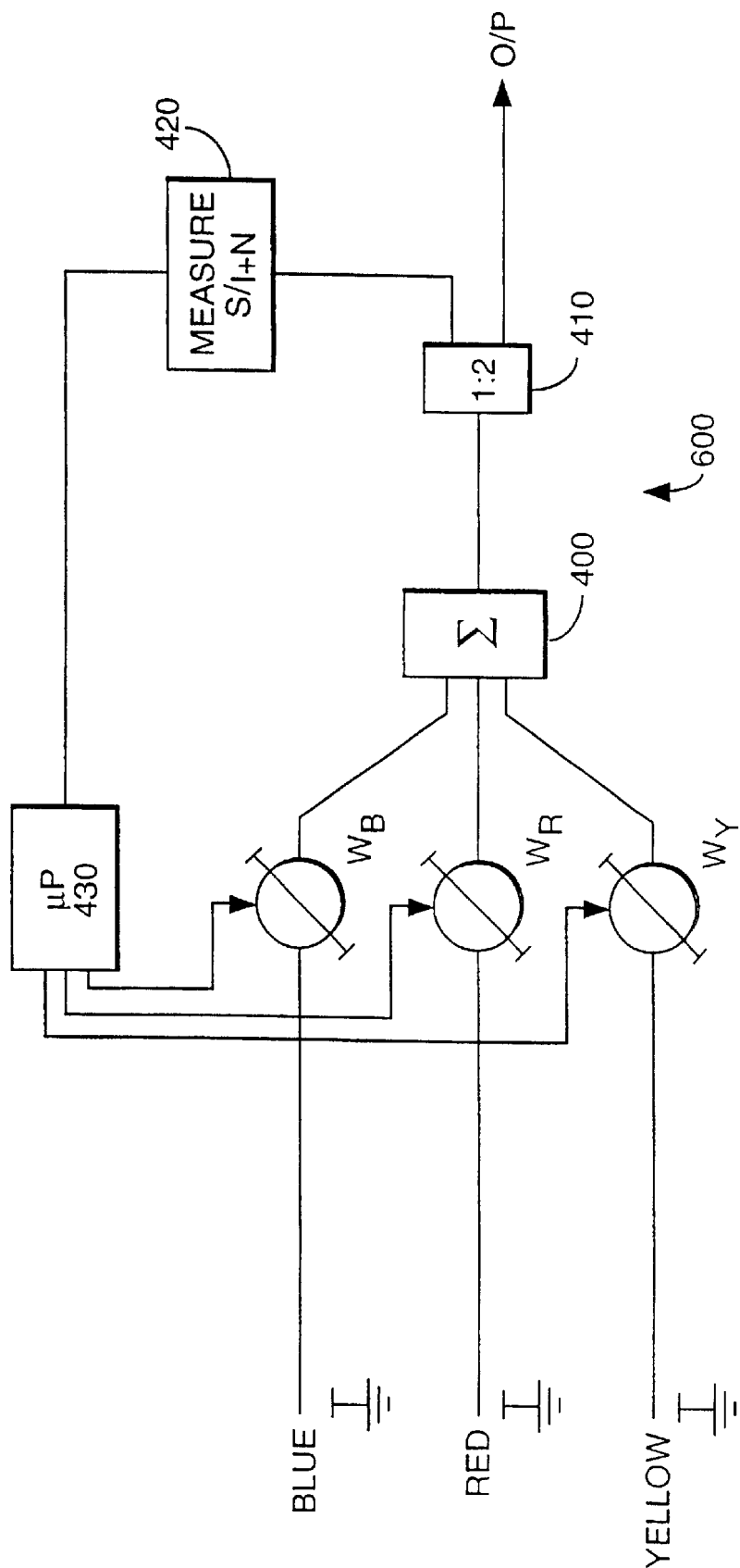
FIG. 8 shows a signal combining arrangement for use in the network of FIGS. 1 and 2.

FIG. 8 shows an arrangement for optimally combining the signals in the manner just described.

A summer 400 has three inputs, one for a signal carried on each of the phase lines. Inserted into each input to the summer is a weight $W_B$, $W_R$, $W_Y$. These weights can be fixed, or their values can be controlled by a microprocessor 430. The weights act upon the signals at RF. The output of summer 400 is the summation of the three inputs. This is split 410 into an output signal and a feedback signal. The feedback signal is fed to measuring unit 420. This unit measures a quantity of the signal which is indicative of its signal to (interference plus noise) ratio S/(I+N)

The relationship between the measured quantity and S/(I+N) need not be linear.

The output of the measuring unit 420 is fed to a microprocessor 430 which runs an algorithm to establish the best weight values to maximise S/(1+N). Measuring unit 420 can perform one of the following techniques to measure a quantity which is indicative of S/(1+N):

(i) for a digital signal, measure bit error rate (BER) using error detecting codes.

(ii) measure eye closure on an eye waveform. A digital modulation format demands that a signal phasor should occupy one of a number of states at a given point in time. Deviation from these states at the relevant time indicates the presence of interference or noise.

(iii) measure interference plus noise at a time when the wanted signal carrier is known to be absent. In a time division duplex format this occurs during the period between transmit and receive bursts. In this case the adaptive loop acts to minimise the interference component without regard to the effect on signal level. This is often an acceptable solution.

(iv) measure interference to thermal noise ratio post-detection (i.e. in a demodulated signal) in a particular frequency band, or at a particular time when the wanted signal is known to be absent (but the carrier is present.) In this case minimising noise level post-detection maximises the carrier to interference ratio pre-detection.

(v) measure signal to interference plus noise ratio at a particular time when a predetermined test signal is known to be present in the signal. The test signal could be a tone or a digital sequence, known by the measuring unit.

The technique by which optimum weight values is established is by perturbation. Microprocessor 430 outputs a set of weight control signals which control the in-phase (I) and quadrature (Q) elements of each weight $W_B$, $W_R$, $W_Y$. The combination of in-phase and quadrature elements allow the weight to set amplitude and phase. The perturbation process works by setting the weight on one channel (the 'clamped' channel) to unity and applying steps in the size of the I and Q weight values on the other channels. The choice of clamp channel is arbitrary, and this allows one of the weights ($W_B$, $W_R$, $W_y$) to be omitted. The effect of the perturbation is shown by the measurement of S/(1+N). The algorithm can work by successively changing I up, I down, Q up, Q down. After these four steps have been performed the change in I or Q which had the best effect on S/(1+N) is adopted. This process continues until the maximum value of S/(1+N) is achieved. The size of each perturbation step can be altered.

When interference is present on the lines, establishing weight sets which maximises S/(1+N) will have the effect of minimising or cancelling the interference.

When interference is absent (and just thermal noise is present on the lines) establishing weight sets which maximises S/(1+N) will maximise the signal level.

These two cases will usually require different weight sets. The perturbation process is operated at all times to maximise S/(1+N) and will therefore adapt the weight sets to changing conditions on the lines.

Figure 9:
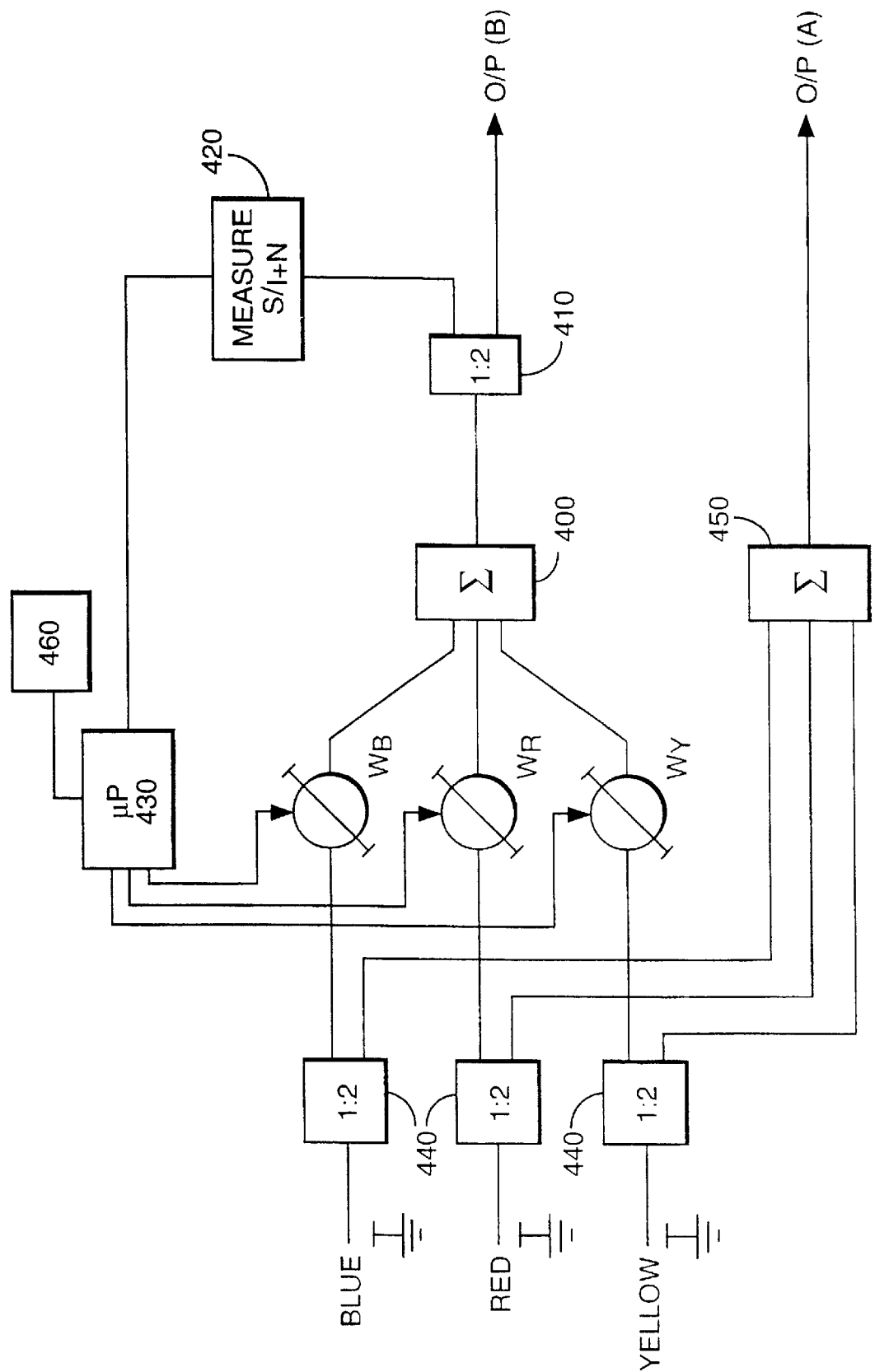
FIG. 9 shows an improvement to the signal combining arrangement of FIG. 8.

An improvement to the arrangement of FIG. 8 is shown in FIG. 9. This differs from the FIG. 8 arrangement in that each input channel (blue, red, yellow) is split into two parts by a splitter 440. A first part of the split signal is fed to a weight, as before. The other part of the split signal is fed directly to a second summer 450. Summer 450 sums in equal parts the signals on its inputs and forms an output A. This output can be used by the subsequent receiver while the perturbation process establishes an optimum set of weight values. When an optimum set of weight values is achieved, output B is used. This improvement prevents disturbances to the signal during the perturbation process.

A base station will usually support more than one call at a time. Each of the calls in progress at the base station requires a particular weighting of signals from the three lines which will be different from that needed for another call in progress. The requirements for two communications protocols will now be examined.

In the CT2 protocol each call occupies one of a set of frequency channels, the channel being alternately used in forward and reverse directions in a time time-division duplexed manner to support two-way communications. A signal combiner is required for each of the calls in progress i.e. one combiner per frequency channel. This is generally true for any frequency division multiple access protocol.

In the DECT protocol a limited number of frequency carriers are time-division multiplexed. A call occupies a pair (or more) of the time slots on a carrier. Other calls occupy different pairs of time slots on the same carrier or a different carrier. A signal combiner is needed for each frequency carrier. This is generally true for any time division multiple access protocol.

Different values can be applied to the weights during each time slot to configure the combiner for the particular call during that time slot. This can be achieved by storing the weight values for each time slot in a memory 460 associated with microprocessor 430 and retrieving them at the appropriate time.

Each call requires a set of weight values which provides optimum S/(1+N). This set of values will differ for different subscribers and will vary according to distance from the base station and the phase line that the subscriber is coupled to. Weight values for each subscriber can be stored in a memory 460 associated with microprocessor 430 and retrieved at the appropriate time. One method is to store a set of weight values at the end of a call with a particular subscriber and to retrieve that same set at the start of the next call with that subscriber. A subscriber's telephone number is a suitable identifier to label the weight set for later retrieval.

This technique can also be used with packet data transmissions over a power line, with different weight values being used to receive data packets from different subscribers.

The combining arrangement has so far been described at the base station, to optimally combine upstream signals on the power lines. Referring again to FIG. 1, interference is a greater problem at the base station because base station BS receives interference not just from cable 120 but also from cables 130, 140. However, it is also possible to install a combining arrangement at a subscribers premises for use on the downstream path. This requires a subscriber to be coupled to at least two of the power lines. This is conveniently achieved at premises which have a three phase connection to cable 120, such as a block of flats.

It is also possible to use the weight sets at the base station to improve the quality of downstream transmissions. FIG. 10 shows a similar arrangement to that of FIG. 4, with a subscriber S1 connected to the red line. A phase shift of $\phi_1°$, $\phi_2°$ occurs when signals are coupled respectively between the blue or yellow lines and the red line. Injecting signals 320, 321, 322 on to each of the lines at the bases station in phase will result in leakage of signals 321, 322 into the red line which have a phase difference of $\phi_1°$, $\phi_2°$ respectively with respect to signal 320 on the red line. By injecting signals at the base station onto the blue and yellow lines with a phase difference of 90° with respect to the red line, subscriber S1 receives the main and leaked components in phase and therefore receives the maximum signal power.

One way of achieving this is to use the upstream weight set values for downstream transmissions. One way of achieving this is to use the combining arrangement of FIG.

8 in reverse. Referring again to FIG. 8, a downstream signal can be injected into summer 400 (which, if it is passive, operates as a splitter in reverse), split into three parts and weighted according to the values of $W_B$, $W_R$, $W_Y$. Alternatively a separate splitter and weight set can be used for downstream transmissions.

When using the same value for the weight set in both directions of transmission, the downstream weight set changes along with the upstream weight set values.

An alternative to using the same value for the weight set in both directions of transmission is to use a measurement of S/(1+N) made at the subscriber terminal and reported back to the base station. Terminals operating according to the CT2 protocol have a RSSI reporting facility, which is a suitable measurement to feed back to the base station in the absence of interference on the lines. However, when interference is present on the line an RSSI measurement does not distinguish between wanted signal power and interference signal power and therefore will tend to maximise total signal powe rather than to maximise S/(1+N).

What is claimed is:

1. Apparatus for extracting communications signals carried upon RF carriers from power lines, which lines suffer from leakage of signals between them, the apparatus comprising:
    means for receiving an RF signal from each of at least two of the lines, which received signals include at least one component of a wanted communications signal;
    means for variably weighting the received signals so as to increase the ratio of wanted signal to interference plus noise S/(1+N), which interference occupies the same frequencies as the RF carriers.

2. Apparatus according to claim 1 further comprising:
    a measuring unit, coupled to the output of the weighting means, which is operable to measure a quantity of the weighted signal which is indicative of the ratio of wanted signal to interference plus noise; and
    control means, coupled to the measuring unit, for controlling the weighting means whereby to increase the value of the measured quantity.

3. Apparatus according to claim 2 wherein the measuring unit measures bit error rate of the weighted signal.

4. Apparatus according to any one of claim 2 wherein the measuring unit measures at a predetermined period during the weighted signal when the wanted signal is known to be absent.

5. Apparatus according to any one of claim 2 wherein the measuring unit measures at a predetermined period during the weighted signal when a carrier of the wanted signal is present, but the modulating signal is known to be absent.

6. Apparatus according to any one of claim 2 wherein the measuring unit measures during a period when a test signal is known to be present in the signal.

7. Apparatus according to claim 1 wherein the weighting means comprises:
    weights for weighting the received signals in phase; and
    a summer which is operable to sum the weighted signals.

8. Apparatus according to claim 7 wherein the weighting means also scales the received signals in amplitude.

9. Apparatus according to claim 7 wherein the control means performs an iterative technique in which perturbations are applied to the weighting means.

10. Apparatus according to any one of the preceding claims wherein the weighting means is operable to weight the received signals in a different manner during each of a plurality of time periods.

11. Apparatus according to claim 10 wherein each time period corresponds to a time slot on a time-shared carrier frequency.

12. Apparatus according to claim 10 wherein the weighting means stores settings for use with weighting signals from a particular subscriber who is coupled to the power lines.

13. Apparatus according to claim 1 wherein the apparatus is also operable to apply a communications signal to each of at least two of the lines.

14. Apparatus according claim 1 comprising an antenna which couples to the weighting means and which is operable to receive interference.

15. Apparatus for applying communications signals to power lines, which lines suffer from leakage of signals between them, there being a subscriber terminal coupled to at least one of the power lines, the apparatus comprising:
    a dividing means for dividing a communications signal;
    means for applying the divided signals to each of at least two of the power lines;
    wherein the dividing means is operable to apply weighting to each of the divided signals whereby to increase the ratio of signal to interference plus noise at a receiver of the subscriber terminal.

16. Apparatus according to claim 15 wherein the dividing means is responsive to measurements made by the subscriber terminal.

17. A method of extracting communications signals carried upon RF carriers from power lines, which lines suffer from leakage of signals between them, the method comprising:
    receiving an RF signal from each of at least two of the lines, which received signals include at least one component of a wanted communications signal; and
    variably weighting the received signals so as to increase the ratio of wanted signal to interference plus noise S/(1+N), which interference occupies the same frequencies as the RF carriers.

18. A method of applying communications signals to power lines, which lines suffer from leakage of signals between them, there being a subscriber terminal coupled to at least one of the power line, the method comprising:
    dividing a communications signal;
    applying the divided signals to each of at least two of the power lines; and wherein the dividing means is operable to apply weighting to each of the divided signals whereby to increase the ratio of signal to interference plus noise at a receiver of the subscriber terminal.

* * * * *